(12) United States Patent
Nesheim et al.

(10) Patent No.: US 10,663,278 B2
(45) Date of Patent: May 26, 2020

(54) PROXIMITY SENSOR FOR SUBSEA ROTATING EQUIPMENT

(71) Applicant: OneSubsea IP UK Limited, London (GB)

(72) Inventors: Tom Inge Nesheim, Sandsli (NO); Daniel Tonning, Laksevåg (NO)

(73) Assignee: ONESUBSEA IP UK LIMITED, London (GB)

( * ) Notice: Subject to any disclaimer, the term of this patent is extended or adjusted under 35 U.S.C. 154(b) by 0 days.

(21) Appl. No.: 15/647,877

(22) Filed: Jul. 12, 2017

(65) Prior Publication Data
US 2019/0017799 A1    Jan. 17, 2019

(51) Int. Cl.
| | |
|---|---|
| *G01B 7/02* | (2006.01) |
| *E21B 47/09* | (2012.01) |
| *E21B 47/01* | (2012.01) |
| *E21B 47/12* | (2012.01) |
| *E21B 47/00* | (2012.01) |

(52) U.S. Cl.
CPC .......... *G01B 7/023* (2013.01); *E21B 47/0007* (2013.01); *E21B 47/011* (2013.01); *E21B 47/0905* (2013.01); *E21B 47/124* (2013.01)

(58) Field of Classification Search
CPC .............................. G01B 7/023; E21B 47/0007
See application file for complete search history.

(56) References Cited

U.S. PATENT DOCUMENTS

| | | | |
|---|---|---|---|
| 4,485,398 A | * | 11/1984 | Chapin, Jr. ............ H04N 5/232 348/333.01 |
| 5,166,677 A | | 11/1992 | Schoenberg |
| 5,219,068 A | | 6/1993 | Piotrowski |
| 2009/0169364 A1 | | 7/2009 | Downton |
| 2010/0065336 A1 | | 3/2010 | Wells et al. |
| 2010/0299119 A1 | | 11/2010 | Erikson et al. |
| 2012/0098674 A1 | | 4/2012 | McStay et al. |
| 2012/0279720 A1 | | 11/2012 | Whitby et al. |
| 2013/0192859 A1 | | 8/2013 | Holiday et al. |
| 2013/0272898 A1 | | 10/2013 | Toh et al. |
| 2014/0035504 A1 | | 2/2014 | Rongve et al. |

(Continued)

FOREIGN PATENT DOCUMENTS

CN    201241695 Y    5/2009

OTHER PUBLICATIONS

General Electric, 3300 XL 11mm Proximity Transducer System: Bently Nevada Asset Condition Monitoring, Aug. 2014, 22 pages, Accessed Feb. 2, 2016, <https://www.gemeasurement.com/sites/gemc.dev/files/3300_xl_11mm_proximity_transducer_system_english.pdf>.

(Continued)

*Primary Examiner* — Daniel R Miller

(57) ABSTRACT

A proximity sensing system is configured to sense proximity of a rotating component in subsea rotating equipment such as pumps, compressors and separators. A plurality of sensing probe modules are included to sense proximity at various locations of the rotating shaft. The probe modules can include a fixed length stinger that can be gas-filled to maintain atmospheric pressure. The probe modules can also be a stinger-less design were the sensor is fixed to an inner pump housing and flexible cable is run through a channel of an outer pump pressure casing to a high pressure penetrator.

13 Claims, 6 Drawing Sheets

(56) References Cited

U.S. PATENT DOCUMENTS

2014/0185201 A1* 7/2014 Barbara ................ H05K 5/066
  361/679.01
2015/0300848 A1 10/2015 Campbell et al.

OTHER PUBLICATIONS

Micro-Epsilon, eddyNCDT: Eddy current sensors for displacement and position, 40 pages, accessed Apr. 17, 2017, <http://www.micro-epsilon.co.uk/displacement-position-sensors/eddy-current-sensor/eddyNCDT_3300/>.
Lion Precision, Eddy-Current Sensors, Aug. 9, 2016, 16 pages, Accessed Apr. 17, 2017, <http://www.lionprecision.com/manuals/lit-pdfs/EddyCurrentSensorCatalog_LionPrecision.pdf>.

* cited by examiner

PROXIMITY SENSOR FOR SUBSEA ROTATING EQUIPMENT

TECHNICAL FIELD

The present disclosure relates to rotating machines configured for subsea deployment. More particularly, the present disclosure relates to proximity sensors configured for use in such rotating machines.

BACKGROUND

Proximity measuring of the rotating shaft of a subsea pump or subsea compressor can give valuable information of the running conditions of the pump or compressors. Proximity measurement of rotating equipment is known in systems operating in low pressure—such as an atmospheric environment found topside. However, proximity sensing of a rotating shaft is much more challenging in subsea pumps or compressors since the process fluid pressures can be in the range of 15-20 kPsi, and where associated electronics needs to be protected against the seabed pressure.

SUMMARY

This summary is provided to introduce a selection of concepts that are further described below in the detailed description. This summary is not intended to identify key or essential features of the claimed subject matter, nor is it intended to be used as an aid in determining or limiting the scope of the claimed subject matter as set forth in the claims.

According to some embodiments, a subsea rotating machine having a proximity sensing system is described. The machine includes: a rotating portion; a non-rotating pressure housing surrounding the rotating portion; a conduit formed through the pressure housing having an inner end opening near a target surface of the rotating portion and a outer end opening to an outer surface of the pressure housing; a proximity sensor probe fixed within the conduit at its inner end, the sensor probe having a sensor tip configured and positioned to sense distance between the sensor tip and the target surface; a high pressure penetrator configured to form a high-pressure seal with the pressure housing; and a cable running from sensor probe, through conduit to the penetrator. According to some embodiments, the cable is a coaxial cable.

According to some embodiments, the machine further includes sensor electronics. The sensor electronics can include an analog to digital converter, and be in electrical connection with the sensor probe via at least the coaxial cable using one or more protected conduits.

According to some embodiments, the subsea rotating machine is a fluid processing machine configured to process fluids at pressures of at least 1500 psi, 3000 psi, 7500 psi or 15000 psi. According to some embodiments, the pressure housing comprises an inner pump housing and an outer pump pressure casing, the probe sensor being fixed to the inner pump housing and the penetrator fixed to an outer surface of the outer pressure casing. The cable can be flexible and configured to allow fixing of the sensor probe to the inner pump housing prior to fixing the penetrator to the outer surface of the pressure casing. The cable can be insulated and otherwise un-housed running from the sensor probe through the conduit and to the penetrator.

According to some embodiments, the proximity sensor probe includes an eddy current coil. The rotating machine can be a fluid processing machine such as a pump, a compressor or a separator.

According to some embodiments, a subsea rotating machine having a proximity sensing system is described. The machine includes: a rotating portion; a non-rotating pressure housing surrounding the rotating portion; and a sensor module having a gas-filled body and comprising a proximity sensor probe near a target surface of the rotating portion and a high pressure penetrator at an outer surface of the pressure housing, the proximity sensor forming a seal with the gas-filled body and having a sensor tip configured and positioned to sense distance between the sensor tip and the target surface, and the penetrator configured to form a high-pressure seal with the pressure housing.

According to some embodiments, the high pressure penetrator includes a flange configured to form a high-pressure seal with the outer surface of the pressure housing. The sensor module can be fixed-length as measured from the sensor tip to the flange. The fixed length can be adjustable using one or more shims and/or machining of flange.

The machine can include a coaxial or other suitable cable running from sensor probe, through gas-filled interior cavity of the body to the penetrator. In some embodiments, the coaxial cable is connector-free apart from connections with the sensor probe and the sensor electronics.

BRIEF DESCRIPTION OF THE DRAWINGS

The subject disclosure is further described in the following detailed description, and the accompanying drawings and schematics of non-limiting embodiments of the subject disclosure. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

The particulars shown herein are for purposes of illustrative discussion of the embodiments of the present disclosure only. In this regard, no attempt is made to show structural details of the present disclosure in more detail than is necessary for the fundamental understanding of the present disclosure, the description taken with the drawings making apparent to those skilled in the art how the several forms of the present disclosure may be embodied in practice.

Figure 1:
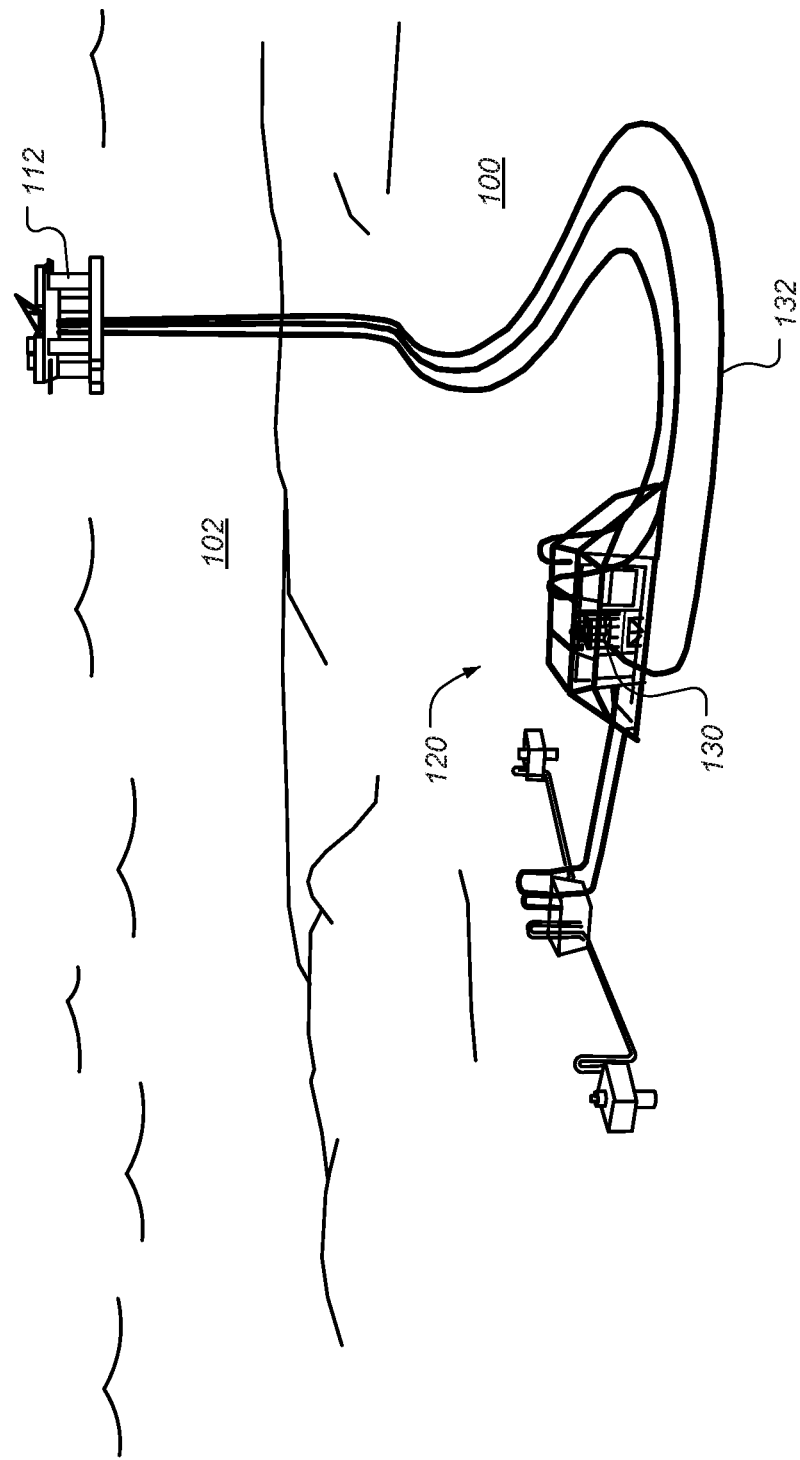
FIG. 1 is a diagram illustrating a subsea environment in which rotating equipment having proximity sensing can be deployed, according to some embodiments.

According to some embodiments, robust and simple proximity sensor systems for subsea rotating equipment such as pumps, compressors and separators are described. FIG. 1 is a diagram illustrating a subsea environment in which rotating equipment having proximity sensing can be deployed, according to some embodiments. On sea floor 100 a station 120 is shown which is downstream of several wellheads being used, for example, to produce hydrocarbon-bearing fluid from a subterranean rock formation. Station 120 includes a subsea pump module 130, which has a pump, compressor, separator or other rotating equipment that is driven by one or more electric motors. The station 120 is connected to one or more umbilical cables, such as umbilical 132. The umbilical in this case is being run from topside facility 112, which is a platform, through seawater 102, along sea floor 100 and to station 120. In other cases, topside facility 112 from which umbilical 132 may be run can be another type of surface facility, such as a floating production, storage and offloading unit (FPSO), or a shore-based facility. In addition to pump module 130, the station 120 can include various other types of subsea equipment, including transformers and other pumps, compressors and or separators. The umbilical 132 can also be used to supply barrier and other fluids, and control and data lines for use with the subsea equipment in station 120. Note that although pump station 130 is referred to herein as a "pump" station, and in many of the examples described herein a pump is used, the techniques described herein are generally applicable to any type of rotating subsea equipment, and as such, any references to a pump shall be understood to also refer to a compressor, separator or other type of rotating equipment.

Figure 2:
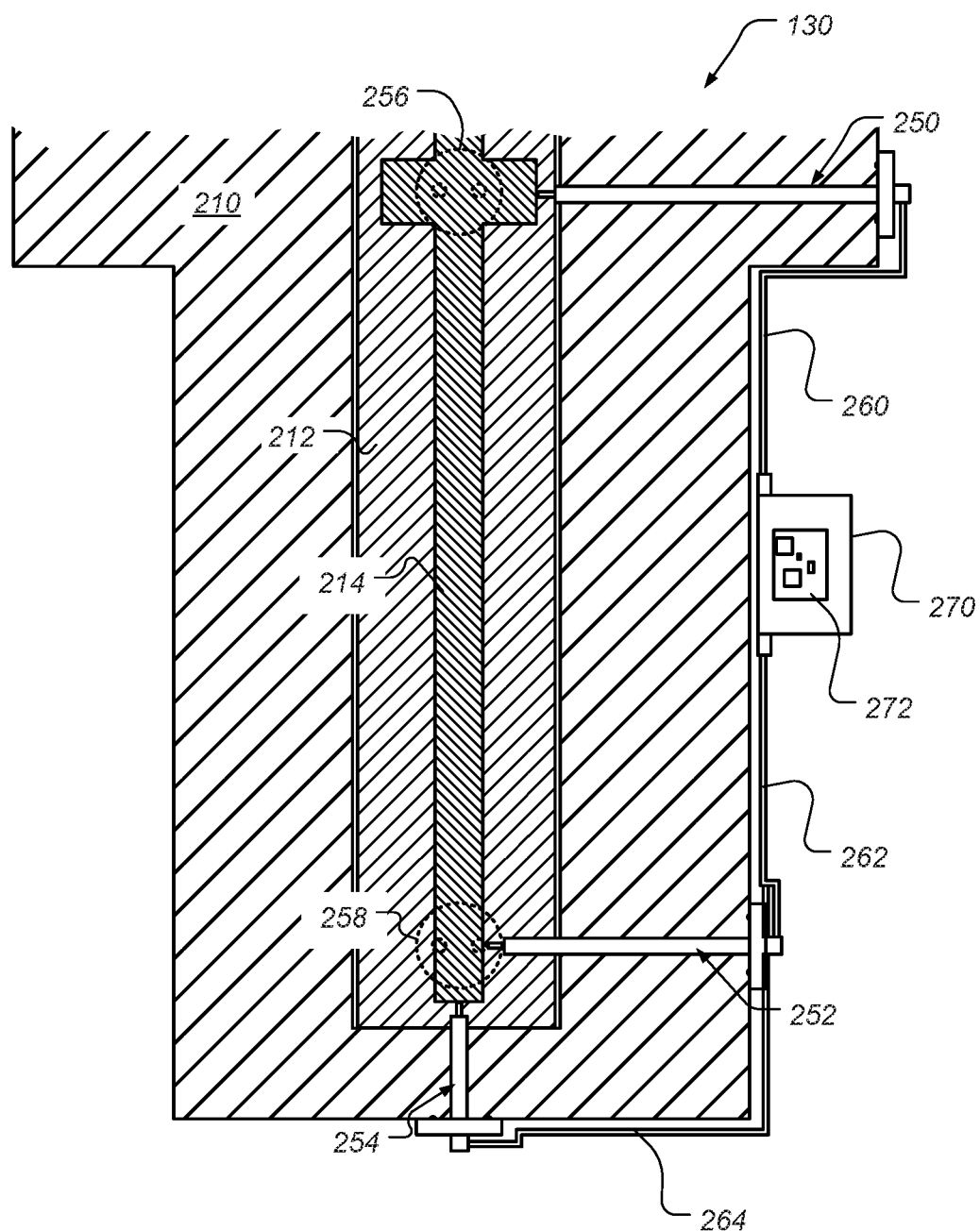
FIG. 2 is a diagram illustrating certain aspects of proximity sensing systems configured for use with subsea rotating equipment, according to some embodiments.

FIG. 2 is a diagram illustrating certain aspects of proximity sensing systems configured for use with subsea rotating equipment, according to some embodiments. Shown is part of a subsea pump 130. The pump 130 includes an outer pump pressure casing 210, an inner pump housing 212 and a rotating shaft 214. In this schematic diagram various elements such as impellers, diffusers, fluid manifolds, bearings and barrier fluid supply systems are not shown. While the rotating shaft 214 is referred to herein as a "shaft" it is understood that shaft 214 includes other elements that are fixed to the shaft and/or rotating along with the shaft about its main longitudinal axis. According to some embodiments, the pump 130 is configured to operate at process pressures of greater than 100, 200, 500 and in some cases 1000 bar. The main components of the proximity sensing system are: the probe modules (such as probe modules 250, 252 and 254); cable piping (such as cable piping 260, 262 and 264); and an electronics canister (such as electronics canister 270).

The probe modules 250, 252 and 254 can be of different types of designs. According to some other embodiments, the probe modules can include a proximity sensor probe mounted within a fixed length "stinger" which is atmospheric and sealed at its tip. The stinger can be fixed to the outer pump pressure casing 210 via flange that can also include high pressure barrier seals. According to some other embodiments, the probe modules can be a "stinger-less" design that is made up of a proximity sensor probe connected via a cable to a high pressure penetrator/barrier. In such stinger-less modules, the sensor probe can be directly fixed to the inner pump housing 212, while the high pressure penetrator is mounted to the outer pump pressure casing 210. Further details of both designs are provided herein infra. According to some embodiments, the cable from the sensor probe to the high pressure penetrator/barrier is a coaxial cable.

Cable piping 260, 262 and 264 can be used to transfer the sensing signal from the probe modules 250, 252 and 254 to the sensor electronics located in the canister 270. According to some embodiments, piping 260, 262 and 264 forms an atmospheric pressure channel between the probe modules and the canister, such that a standard cable can be used within the piping. As used herein the terms "atmospheric" and "atmospheric pressure" refers not only to a standard atmosphere (i.e. about 1 bar), but also includes other gas pressures that would allow standard electronics and cabling to be used. For example, the range could include less than 0.5 bar to 5 bar. According to some embodiments, the cable piping and electronics canister is filled with a gas such as nitrogen that reduces the likelihood of corrosion and other faults.

Electronics 272 are included within the electronics canister 270. According to some embodiments, the electronics are positioned in a canister in an atmospheric environment with constant temperature and at a reasonable distance from the sensor tip of the probe modules. According to some other embodiments, the electronics 272 can be located in a canister that is a part of the probe modules 250, 252 and/or 254. Locating the electronics 272 in the probe module can provide improved temperature compensation as well as much simplified cable routing as well as a simpler penetrator.

The sensing location where the sensor tip is located, very close to the rotating shaft 214, is relatively harsh can generally includes high temperature and vibrations. As will be described in further detail, a sensing element in the probe modules can be an eddy current coil that is molded in a metal-glass penetrator. This type of sensing element is quite robust and is only affected by the harsh environment to a minor degree. By separating the robust sensing element and the more fragile electronics by using an atmospheric channel, the proximity sensing system is configured to be quite robust and simple. Note that in order to get electric power into the electronic canister 270 and the proximity signal out of the canister 270, a penetrator/connector is installed that is not shown.

According to some embodiments, the electronics 272 includes four basic modules. Analog sensor electronics are used to interface with the sensor element, which can be an eddy current coil. An Analog-Digital converter is used to convert the signal into digital form. A processor unit is used for control and data processing. Finally, an interface is used to communicate the signal out of the canister. A typical interface that can be used is SIIS-3 Ethernet or SIIS-2 CanBus.

The number of sensors can be from one to as many as practical for the installation. According to some embodiments, one or more sensors are mounted at each of one or more longitudinal positions along the shaft 214. At each longitudinal position, it is useful to include two proximity sensors offset by 90 degrees. In some cases it has been found useful to sense proximity near the upper end of the shaft 214 such as near or at the thrust disk bearing. In the case of FIG. 2, probe module 250 is located at the thrust disk bearing which is at the drive-end of the pump 130. Additionally, dotted outline 256 shows the position of another probe module that is offset from module 250 by 90 degrees. According to some embodiments two or more further probe modules are positioned near the non-drive end of the pump 130. In this case, probe 252 is shown along with the location 258 of another probe module that is offset from probe 252 by 90 degrees. In the case of FIG. 2, a further probe module 254 is positioned below the shaft 214 to sense proximity of the shaft in the z-direction (or vertical direction).

According to some embodiments, the ability to determine rotational position can be provided. For example, the shaft 214 can include a notch or have a different material embedded therein that allows for the sensing of the absolute rotational position of the shaft 214. In such cases a dedicated reference sensor could be used or it could be combined with one or more of the existing probes. In this cases the rotational position can be known as well as speed and phase of the shaft 214.

Although the proximity sensing system is shown in FIG. 2 as sensing the proximity of the shaft in a pump 130, according to some embodiments, it can also used to sense shaft behavior in the motor portion of the rotating equipment.

Figure 3:
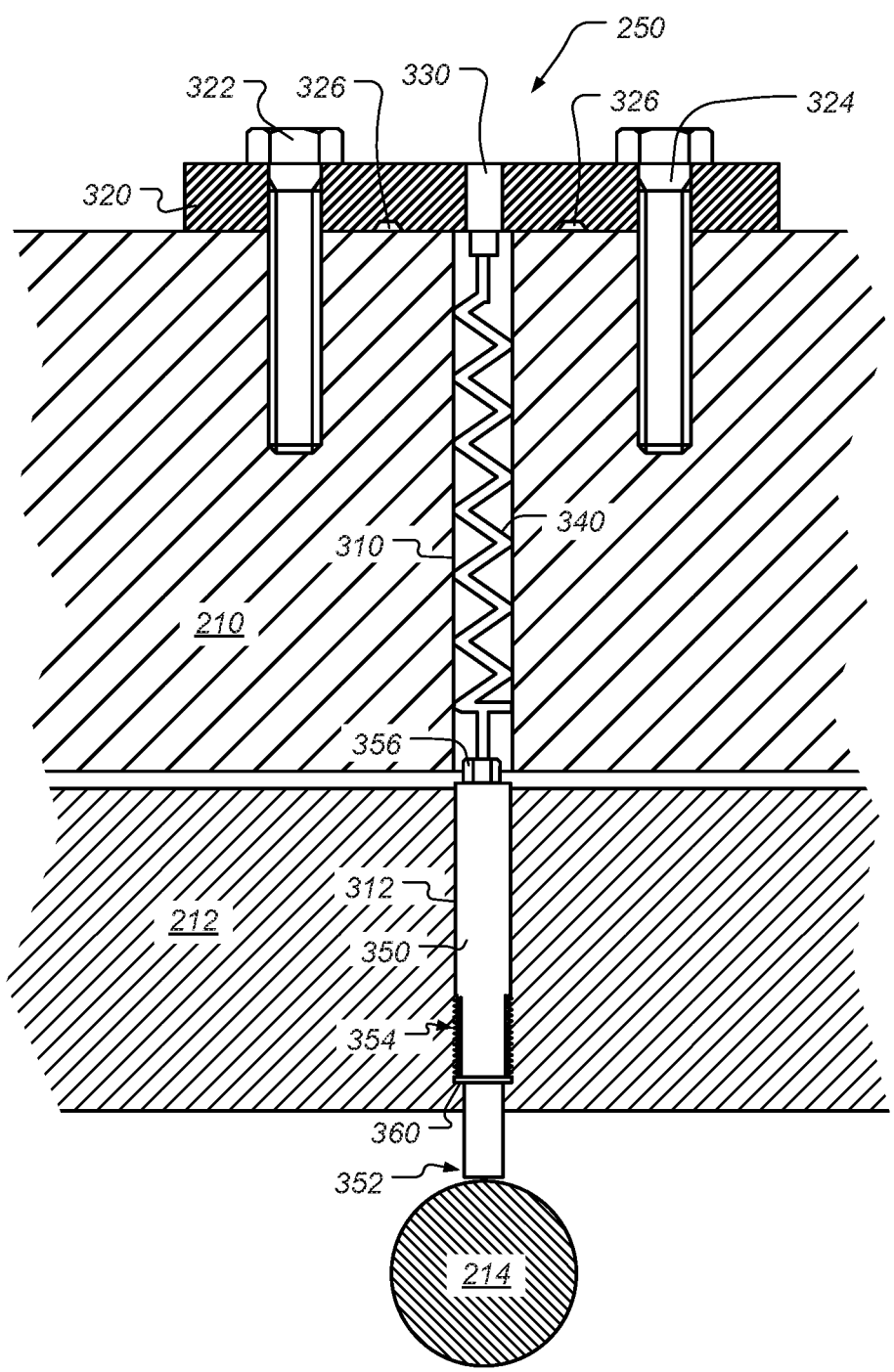
FIG. 3 is a diagram illustrating certain aspects of a proximity probe module used in a proximity sensing system on subsea rotating equipment, according to some embodiments.

FIG. 3 is a diagram illustrating certain aspects of a proximity probe module used in a proximity sensing system on subsea rotating equipment, according to some embodiments. In this example, the proximity probe module 250 is a stinger-less design, that includes a proximity sensor probe 350 connected via a coaxial cable 340 to a high pressure penetrator 320 that is mounted to the exterior of pump pressure casing 210. The sensor probe 350 is mounted directly to inner pump housing 212. When compared with other configurations, the stinger-less arrangement can provide advantages in terms of accuracy—since the sensor probe can be mounted relatively close on an inner portion of the housing.

The sensor probe is positioned within a channel or conduit 312 that is formed in pump housing 212. In some examples, the sensor probe 350 can be configured to be screwed into the pump housing 212 using threads 354 and nut 356. According to some embodiments, one or more shims 360 can be used to fine-tune the spacing between the tip 352 and the shaft 214. In many pump designs the inner pump casing 212 includes the carriers for the shaft bearings and is therefore very close to the shaft 214. The sensor probe tip 352 is positioned in close proximity to the shaft 214. Mounting the sensor probe 350 directly to the inner pump casing 212 therefore reduces vibration from outer pressure casing 210, which further enhances accuracy of the proximity sensing system.

According to some embodiments, the proximity sensor probe 350 is configured to provide a high level of precision in measuring the distance from the tip 352 to the object being measured (e.g. shaft 214). According to some embodiments an eddy current coil sensor is used in sensor probe 350. An eddy current coil sensor is simple and robust for such applications. It is important to protect the eddy current sensor (or other type of sensor) from the high pressure, and at the same time allow for sufficiently close positioning to the shaft. According to some embodiments, the entire sensor probe 350 is solid without any voids so that it does not need any pressure compensation. According to some embodiments, the eddy current sensor includes a a metal coiled conductor molded within a solid ceramic body. Another suitable sealing technology is to mold the eddy current coil in glass. Note that the eddy current coil arrangement can be used in embodiments where the electronics are incorporated into the probe module as well as in embodiments where the electronics are located elsewhere. It has been found that an eddy current coil sealed in molded glass can be protected against the pressure. According to some other embodiments, a ceramic window can be used such as is known for subsea tools, for example gamma detectors. Such ceramic windows is qualified for 15 kPsi and have a diameter of 12 mm and thickness of 4 mm.

The high-pressure penetrator 320 is mounted to the pump pressure casing 210. The high-pressure penetrator 320 design can be adjusted to meet the pressure rating for the actual pump that is being fitted with proximity sensor(s). The penetrator 320 can fixed to the outer pump casing 210 using a plurality of bolts, of which bolts 322 and 324 are visible. Sealing can be accomplished using an o-ring 326, or other suitable sealing techniques. An electrical high-pressure, sealed connector 330 is mounted on the penetrator 320 and provides electrical connection to conductors (e.g. coaxial cable) running though the piping such as piping 260 shown in FIG. 2.

Flexible cable 340 is a cable disposed in a channel or conduit 310 between the probe sensor 350 and connector 330 on penetrator 320. Conduit 310 is a channel or bore formed directly through the casing 210 and, according to some embodiments, no other shell or housing is provided between the cable 340 the walls of conduit 310 formed in casing 210. Coaxial type cable is suitable for cable 340 since the analog signal is fairly sensitive to noise. Flexibility, such as coiling, is used to give space to allow connection of the cable to the connector 330 on penetrator 320. According to some embodiments, the probe sensor 350 is first mounted into the channel 312 of inner pump housing 212. This can be accomplished using a special long, narrow tool that engages nut 356 before the penetrator 320 is bolted to the outer pressure casing 210. In such cases the cable 340 should be flexible enough to allow the tool-mounting of sensor probe 350 while the penetrator 320 has not yet been mounted. The cable 340 can either be pre-attached to the connector 330 or it may be attached prior to mounting of the penetrator 320 on the outer pressure casing 210. According to some embodiments, the cable 340 (or connector 330) can be mated to diagnostic electronics during mounting of the sensor probe 350 to determine the exact tip to target surface spacing and allow for shims to be added or removed as desired. According to some embodiments, the cable 340 is connector-free, such that a single insulated coax cable is turn from the sensor probe 350 all the way to the electronics 272 in the canister 270. In such cases cable piping (such as shown in FIG. 2), if used, can be used for physical protection only and may not be gas-filled. According to some embodiments, some or all of the sensor electronics 272 (shown in FIG. 2) is located within the body of sensor probe 350. In such cases, the cable 340 is configured to carry digital signals instead of analog.

Figure 4:
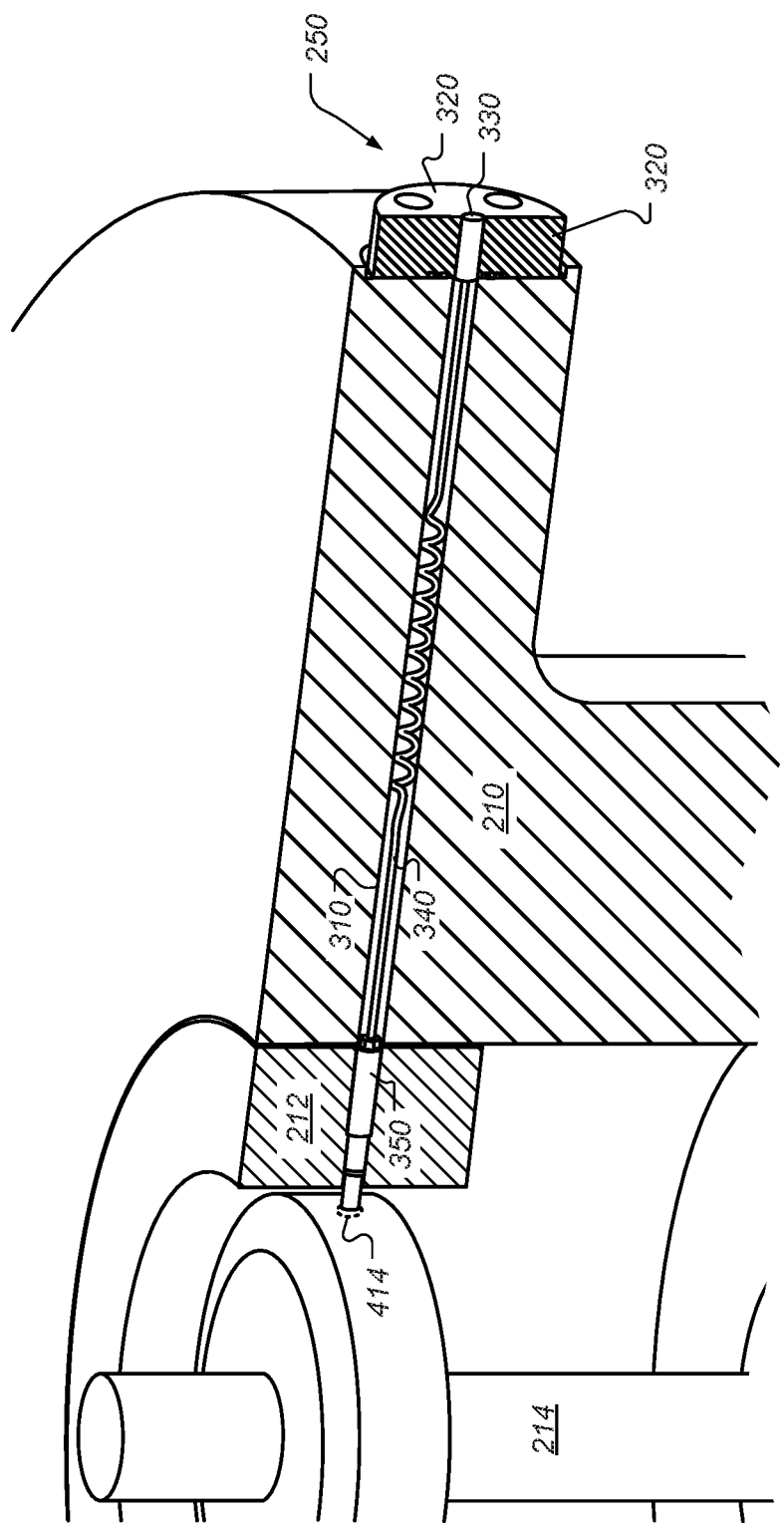
FIG. 4 is another view illustrating aspects of a stinger-less proximity probe module used in a proximity sensing system on subsea rotating equipment, according to some embodiments.

FIG. 4 is another view illustrating aspects of a stinger-less proximity probe module used in a proximity sensing system on subsea rotating equipment, according to some embodiments. Flexible cable 340 is shown having coils within the conduit 310 formed in outer pump pressure casing 210. In this case the target surface, shown in dotted outline 414, is the outer surface of a thrust disk that is mounted to (or forms part of) shaft 214.

Figure 5:
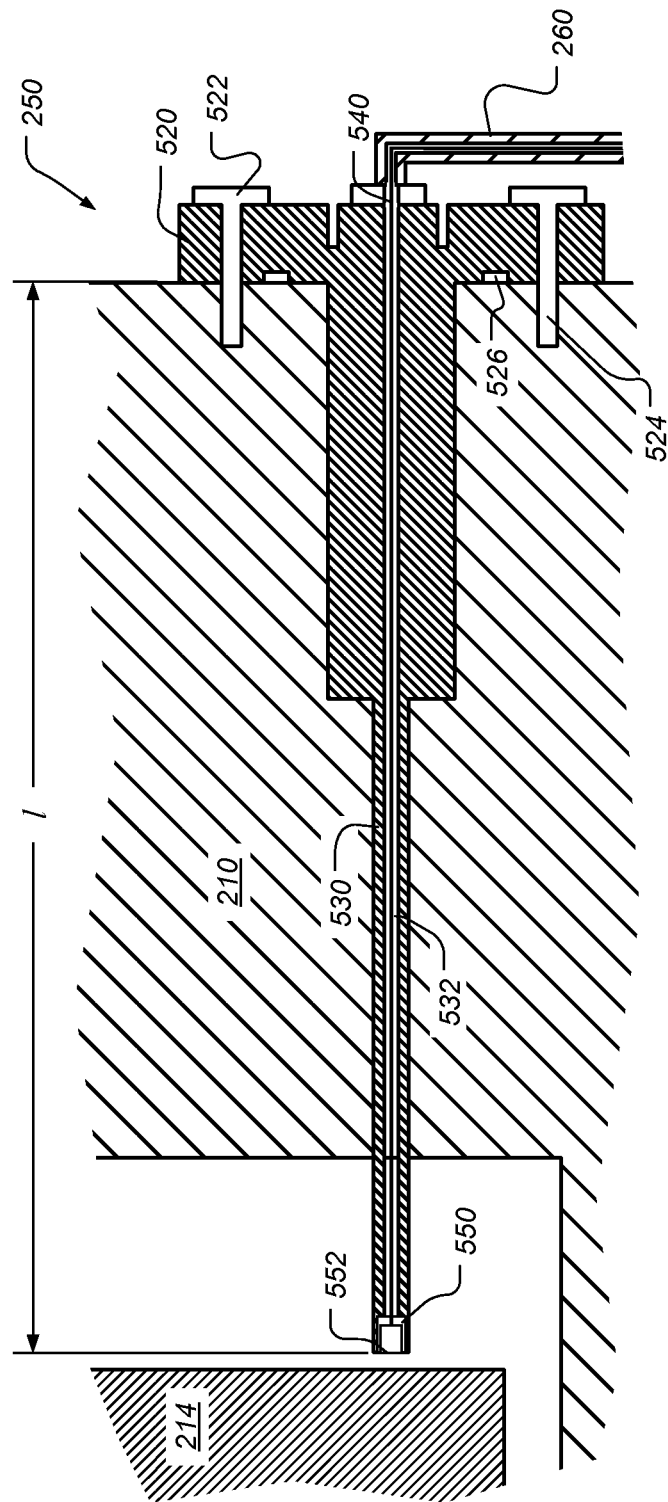
FIG. 5 is a diagram illustrating certain aspects of a proximity probe module used in a proximity sensing system on subsea rotating equipment, according to some embodiments.

FIG. 5 is a diagram illustrating certain aspects of a proximity probe module used in a proximity sensing system on subsea rotating equipment, according to some embodiments. In this example, the proximity probe module 250 is a sealed, gas-filled stinger design having a fixed length. The module 250 includes a flange 520, stinger 530 and sensor 550. A channel or conduit 532 is formed through the stinger 530 and flange 520 as shown and in which cable 540 is positioned. Conduit 532 is gas-filled as will be described in further detail below. The cable 540, which can be coaxial cable, connects the sensor 550 with the sensor electronics (e.g. electronics 272 shown in FIG. 2). The flange 520 and stinger 530 can be made from a single piece of metal or can be welded or otherwise formed from multiple pieces. The stinger 530 has a fixed length/as measured from the sensor tip 552 to the inner edge of the flange 520. The probe module 250 is sealed at both the sensor probe 550 and the flange 520. Sensor probe 550 can include an eddy current coil sealed in molded glass for protection against the pressure. The sensor probe 550 is sealed within the end of stinger 530 to provide a high pressure barrier between the outside of the sensor and an atmospheric pressure in conduit 532. Flange 520 uses o-ring 526 or other suitable sealing techniques to form a seal between flange 520 and the outer surface of pump pressure casing 210. Flange 520 is attached to casing 210 using a plurality of bolts, of which bolts 522 and 524 are visible. According to some embodiments, placing one or more shims between the inner edge of flange 520 and the outer surface of casing 210 and/or machining of the inner edge of the flange 520 can be used to alter the effective length 1, to accommodate any tolerance or out of specification issues. If machining of the inner edge is foreseeable for a particular application, the flange 520 can be manufactured with extra thickness to allow for such accommodation.

By using a fixed length stinger probe module 250 with high pressure sealed sensor 550 during assembly of the pump, the only location in which a seal is made is between the flange 520 and the casing 210. Thus the described proximity sensing system does not significantly complicate the pump assembly process. When using a fixed length stinger, such as shown in FIG. 5, the distance from sensor tip 552 to the shaft 214 should be known precisely. The accuracy of the distance l should be high enough to make the maximum required distance from the sensor tip 552 to the shaft 214 to be within the range of the sensor 550. By increasing the eddy current coil diameter, the sensor range can be increased. An increased coil diameter will lead to an increased minimum shaft diameter. A shaft-flange accuracy of ±0.4 mm can be achieved with typical tolerances for subsea pumps. Minimum clearance from sensor tip to shaft of 1 mm is sufficient to prevent contact between the shaft and sensor tip during normal shaft movement. A typical eddy current sensor having a diameter of 11 mm has a range of 0.5 mm-4.5 mm, and has shown good test results up to 6 mm. Sensors having 18 mm diameter have ranges of 0.75 mm-5.75 mm. According to some embodiments, sensor diameters for the configuration shown in FIG. 5 can be 25 mm or even greater.

According to some embodiments, conduit 532 forms part of the same atmospheric channel as the piping 260 as shown in FIG. 5. In this way, an atmospheric gas-filled (e.g. nitrogen) channel is provided all the way from the sensor 550 to the electronics canister 270 (shown in FIG. 2) where the cable from the sensing element is located and out to the piping. By providing a continuous atmospheric gas-filled channel, the cabling requirements are simplified. For example, the cable 540 does not have to be designed to tolerate barrier fluid or other pressure compensating fluid, and additional connectors and high-pressure penetrators can be avoided. Furthermore, the probe module 250 as shown in FIG. 5 and piping and electronics can be assembled in air.

Figure 6:
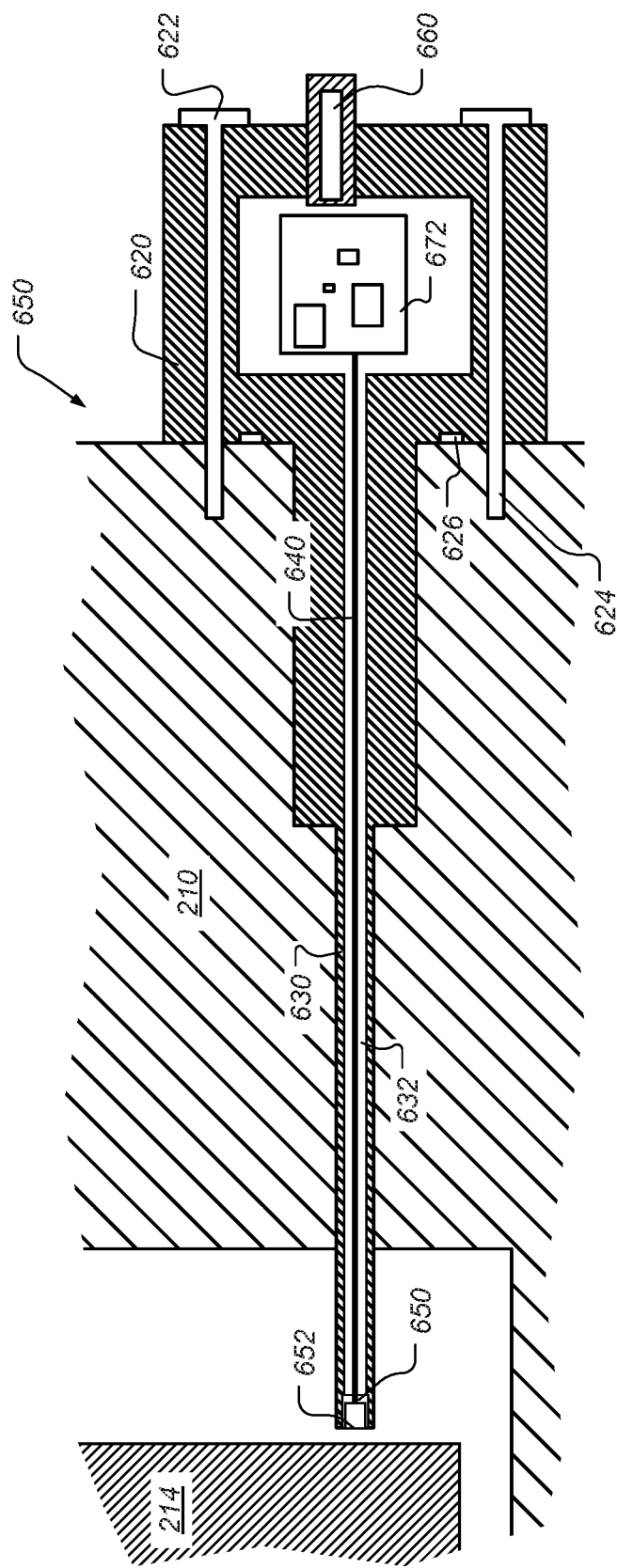
FIG. 6 is a diagram illustrating certain aspects of a proximity probe module that includes sensor electronics configured for sensing proximity on subsea rotating equipment, according to some embodiments.

FIG. 6 is a diagram illustrating certain aspects of a proximity probe module that includes sensor electronics configured for sensing proximity on subsea rotating equipment, according to some embodiments. In this example, the "canister" 620 is integrated into the flange structure of probe module 650. This arrangement can be used in cases where the sensor electronics 672 are dedicated to a single probe sensor 650. This can be the case where only a single proximity sensor module is used. In other cases there can be multiple probe modules, with each having their own dedicated canister and electronics. In yet other cases, one probe module is configured as shown in FIG. 6 and other probe modules are as shown in FIGS. 3, 4 and/or 5. In these cases, the probe modules without electronics can have piping cables running to the electronics of the probe module(s) that has electronics.

The module 650 includes a flange/canister 620, electronics 672, stinger 630 and sensor 650. A channel or conduit 632 is formed through the stinger 630 and to the flange/canister 620 as shown and in which cable 640 is positioned. According to some embodiments, conduit 632 is gas-filled and atmospheric. According to other embodiments, a canister 620 is integrated into a high-pressure penetrator of a stinger-less configured probe module, such as penetrator 320 of probe module 250 shown in FIGS. 3 and 4. The cable 640, which can be coaxial cable, connects the sensor 650 with the sensor electronics 672. Sensor electronics 672 can be similar or identical to electronics 272 described supra. The probe module 650 is sealed at both the sensor probe 650 and the flange/canister 620. Sensor probe 650 can include an eddy current coil sealed in molded glass for protection against the pressure. The sensor probe 650 is sealed within the end of stinger 630 to provide a high pressure barrier between the outside of the sensor and an atmospheric pressure in conduit 632. Flange/canister 620 uses o-ring 626 or other suitable sealing techniques to form a seal between flange/canister 620 and the outer surface of pump pressure casing 210. Flange/canister 620 is attached to casing 210 using a plurality of bolts of which bolts 622 and 624 are visible. According to some embodiments, placing one or more shims between the inner edge of flange/canister 620 and the outer surface of casing 210 and/or machining can be used to alter the effective length of the stinger 630, if desired.

While the proximity sensor has been described herein as using an eddy current coil type sensor, other types of proximity sensor techniques can be used. According to some embodiments, other types of sensors such as: ultrasonic and/or light-optical sensors are used instead of or in addition to the eddy current coil sensors.

While the subject disclosure is described through the above embodiments, it will be understood by those of ordinary skill in the art, that modification to and variation of the illustrated embodiments may be made without departing from the concepts herein disclosed.

What is claimed is:

1. A subsea rotating machine having a proximity sensing system comprising:
  a rotating portion;
  a non-rotating pressure housing surrounding the rotating portion, the non-rotating pressure housing comprises:
    an outer casing;
    an inner casing within the outer casing;
  a conduit formed through the outer casing and the inner casing having an inner end opening in the inner casing near a target surface of the rotating portion and an outer end opening to an outer surface of the outer casing;
  a proximity sensor probe fixed in the conduit within the inner casing, the proximity sensor probe having a sensor tip configured and positioned to sense distance between the sensor tip and the target surface;
  a high pressure penetrator configured to form a high-pressure seal with the non-rotating pressure housing; and a cable running from the proximity sensor probe, through the outer casing to the high pressure penetrator.

2. The machine of claim 1 further comprising sensor electronics including an analog to digital converter, the sensor electronics being in electrical connection with the proximity sensor probe via at least the cable.

3. The machine of claim 2 wherein the sensor electronics are electrically-coupled with the proximity sensor probe using one or more protected conduits.

4. The machine of claim 3 wherein the one or more protected conduits are configured to be gas-filled.

5. The machine of claim 2 wherein the sensor electronics are electrically coupled with a plurality of proximity sensor probes.

6. The machine of claim 1 wherein the cable is a coaxial cable.

7. The machine of claim 1 wherein the proximity sensor probe includes at least some electronics.

8. The machine of claim 1 wherein the machine is a fluid processing machine configured to process fluids at pressures of at least 100 bar.

9. The machine of claim 8 wherein the fluid processing machine is configured to process fluids at pressures of at least 1000 bar.

10. The machine of claim 1 wherein the cable is flexible and configured to allow fixing of the proximity sensor probe to the inner pump housing prior to fixing the high pressure penetrator to the outer surface of the pressure casing.

11. The machine of claim 1 wherein the cable is insulated and otherwise un-housed running from the proximity sensor probe through the conduit and to the high pressure penetrator.

12. The machine of claim 1 wherein the proximity sensor probe includes an eddy current coil.

13. The machine of claim 1 wherein the subsea rotating machine is of a type selected from a group consisting of: pump, compressor and separator.

* * * * *